United States Patent

Silver et al.

(10) Patent No.: US 9,458,321 B2
(45) Date of Patent: Oct. 4, 2016

(54) METHOD OF PREPARING A PIGMENT PRESS CAKE AND USES THEREOF

(71) Applicant: E. I. DU PONT DE NEMOURS AND COMPANY, Wilmington, DE (US)

(72) Inventors: James A. Silver, Kennett Square, PA (US); Chad C. Roberts, Hockessin, DE (US); Christian Jackson, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 14/410,334

(22) PCT Filed: Jun. 27, 2013

(86) PCT No.: PCT/US2013/048090
§ 371 (c)(1),
(2) Date: Dec. 22, 2014

(87) PCT Pub. No.: WO2014/004771
PCT Pub. Date: Jan. 3, 2014

(65) Prior Publication Data
US 2015/0322267 A1 Nov. 12, 2015

Related U.S. Application Data

(60) Provisional application No. 61/666,331, filed on Jun. 29, 2012, provisional application No. 61/666,339, filed on Jun. 29, 2012.

(51) Int. Cl.

| C09B 1/56 | (2006.01) |
|---|---|
| C09B 67/08 | (2006.01) |
| C09D 11/38 | (2014.01) |
| C09D 11/102 | (2014.01) |
| C09C 1/56 | (2006.01) |
| C09B 67/00 | (2006.01) |
| C09B 67/20 | (2006.01) |
| C09C 3/10 | (2006.01) |
| C09D 11/322 | (2014.01) |
| C09C 3/00 | (2006.01) |
| C09C 3/04 | (2006.01) |

(52) U.S. Cl.
CPC ....... *C09B 67/0011* (2013.01); *C09B 67/0022* (2013.01); *C09B 67/0066* (2013.01); *C09C 1/56* (2013.01); *C09C 3/10* (2013.01); *C09D 11/102* (2013.01); *C09D 11/322* (2013.01); *C09D 11/38* (2013.01); *C01P 2006/22* (2013.01); *C09C 3/006* (2013.01); *C09C 3/041* (2013.01)

(58) Field of Classification Search
CPC .................................................. C09B 67/0066
USPC .................................................. 523/160, 161
See application file for complete search history.

(56) References Cited

U.S. PATENT DOCUMENTS

| 2,439,442 A | 4/1948 | Amon |
| 4,597,794 A | 7/1986 | Ohta et al. |
| 5,085,698 A | 2/1992 | Ma et al. |
| 5,231,131 A | 7/1993 | Chu et al. |
| 6,117,921 A | 9/2000 | Ma et al. |
| 6,120,594 A | 9/2000 | Curtis et al. |
| 6,262,152 B1 | 7/2001 | Fryd et al. |
| 6,306,994 B1 | 10/2001 | Donald et al. |
| 6,433,117 B1 | 8/2002 | Ma et al. |
| 6,471,764 B1 | 10/2002 | Robertson et al. |
| 6,852,156 B2 | 2/2005 | Yeh et al. |
| 6,926,768 B2 | 8/2005 | Arthur et al. |
| 2004/0237842 A1* | 12/2004 | Hall-Goulle ........ C09B 67/0022 106/413 |
| 2007/0021530 A1* | 1/2007 | Palumbo ............... C09B 67/009 523/160 |
| 2010/0126378 A1* | 5/2010 | Vilner .................... C09B 63/005 106/31.75 |
| 2012/0081460 A1* | 4/2012 | Fukaya ................ C09D 11/322 347/42 |

FOREIGN PATENT DOCUMENTS

EP 0556649 8/1993

* cited by examiner

*Primary Examiner* — Doris Lee
(74) *Attorney, Agent, or Firm* — Simon L. Xu

(57) ABSTRACT

A process for preparing a pigment press cake is provided in which a pigment, a grinding agent, a polyetheramine, and a vehicle are subjected to grinding, followed by removal of the grinding agent and the vehicle to form a press cake. Also disclosed are a process to disperse the press cake with a polymeric dispersant in an aqueous vehicle to form a pigment dispersion and using the dispersion to form an aqueous ink jet ink.

11 Claims, No Drawings

METHOD OF PREPARING A PIGMENT PRESS CAKE AND USES THEREOF

CROSS REFERENCE TO RELATED APPLICATIONS

This application claims priority under 35 U.S.C. §119 from U.S. Provisional Application Ser. Nos. 61/666,331 and 61/666,339, both filed Jun. 29, 2012, which are incorporated by reference in their entirety.

BACKGROUND OF THE DISCLOSURE

This disclosure pertains to processes of making pigment press cakes and using the pigment press cakes in preparing aqueous pigment dispersions. The dispersions thus obtained may be used in the preparation of aqueous ink-jet inks, pigmented paints, and the like. More particularly, this disclosure relates to a process of making pigment press cakes by coating pigments with polyetheramines using a grinding process.

Aqueous dispersions of pigments are widely used in ink-jet printing. Because a pigment is typically not soluble in an aqueous vehicle, it is often required to use a dispersing agent, such as a polymeric dispersant or a surfactant, to produce a stable dispersion of the pigment in the aqueous vehicle.

The use of dispersing agents, however, increases the viscosity of the dispersion over what it would be without the dispersing agents. Certain end use application of the dispersion, such as ink-jet ink, may have limitations on viscosity, thus having dispersing agents in a dispersion may reduce the formulation latitude of the dispersion for final products.

The use of self-dispersing pigment has been known in the art for many years. U.S. Pat. No. 2,439,442 discloses a process in which a carbon black pigment is exothermically reacted with a water solution of sodium hypochlorite, or is subjected to electrolysis in a sodium chloride solution, or is suspended in a sodium hydroxide solution and treated with chlorine gas to alter the colloidal properties such that the carbon black will readily and spontaneously disperse in water. U.S. Pat. No. 6,852,156 discloses a process of oxidizing carbon black using ozone under a dispersive environment. U.S. Pat. No. 6,120,594 discloses the oxidation of carbon black with hydrogen peroxide. U.S. Pat. No. 6,471,764 discloses the treatment of pigments with certain etheramine dispersing salts. U.S. Pat. No. 6,926,768 discloses treatment of organic pigments with certain etheramine salts.

While there are many approaches focusing on modifying the pigment surface by chemical reactions leading to hydrophilic moieties covalently attached to the pigment surface, organic color pigments such as quinacridone magenta, cyan and yellow are inherently difficult to treat and functionalize by chemical processing to produce a pigment that is readily dispersible in an aqueous vehicle.

A need exists for an effective, easy-to-operate, and lower cost process for making stable pigment dispersions containing organic color pigments as colorant. The present disclosure satisfies this need by providing a process for making a pigment dispersion by using a pigment press cake prepared from a coating process to entrap a hydrophilic polyetheramine to the surface of a pigment and thus facilitate the interaction between the pigment and a dispersant resulting in a stable pigment dispersion.

SUMMARY OF THE DISCLOSURE

An embodiment of the present disclosure provides a process for making a pigment press cake comprising the steps of:

(a) grinding a mixture comprising a pigment, a grinding agent and a vehicle to form a premix, wherein said grinding agent is insoluble in said vehicle and soluble in water, (b) adding to said premix a polyetheramine having the formula (I):

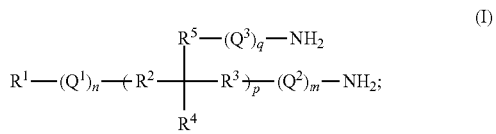

(c) grinding said premix and said polyetheramine together; and (d) washing with an aqueous medium to remove said grinding agent to form a press cake;

wherein each $Q^1$, $Q^2$ and $Q^3$ is independently —$OCH_2CH_2$— or —$OCH_2CH(CH_3)$—; $R^1$ is $C_1$-$C_4$ alkyl, —$CH_2CH(NH_2)(CH_3)$ or $NH_2$; each $R^2$ and $R^3$ is independently $C_1$-$C_4$ alkyl or a straight bond; each $R^4$ is H, $C_1$-$C_4$ alkyl or -$(Q^3)_q$-$NH_2$; each $R^5$ is $C_1$-$C_4$ alkyl or a straight bond; n is an integer from 0 to 60; m is an integer from 2 to 30; p is an integer from 0 to 5; and each q is an integer from 0 to 30.

Another embodiment provides that the grinding agent is an inorganic salt.
Another embodiment provides that p is 0.
Another embodiment provides that $R^1$ is $NH_2$.
Another embodiment provides that $Q^1$ is —$OCH_2CH_2$—.
Another embodiment provides that $Q^2$ is —$OCH_2CH(CH_3)$—.
Another embodiment provides that n is 0.
Another embodiment provides that m is from 2 to 10.
Another embodiment provides that $R^1$ is $CH_3$.
Another embodiment provides that $R^1$ is —$CH_2CH(NH_2)(CH_3)$.

Another embodiment provides a process for making an aqueous pigment dispersion comprising the steps of:

(a) grinding a mixture comprising a pigment, a grinding agent and a vehicle to form a premix, wherein said grinding agent is insoluble in said vehicle and soluble in water, (b) adding to said premix a polyetheramine having the formula (I):

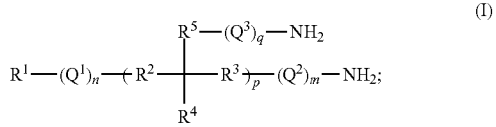

(c) grinding said premix and said polyetheramine together;

(d) washing with an aqueous medium to remove said grinding agent to form a press cake; and (e) adding an aqueous vehicle and a polymeric dispersant, and dispersing said press cake from step (d), in this order or any other workable orders, to form a dispersion;

wherein each $Q^1$, $Q^2$ and $Q^3$ is independently —$OCH_2CH_2$— or —$OCH_2CH(CH_3)$—; $R^1$ is $C_1$-$C_4$ alkyl, —$CH_2CH(NH_2)(CH_3)$ or $NH_2$; each $R^2$ and $R^3$ is independently $C_1$-$C_4$ alkyl or a straight bond; each $R^4$ is H, $C_1$-$C_4$ alkyl or -(Q³)_q-NH₂; each R⁵ is C₁-C₄ alkyl or a straight bond; n is an integer from 0 to 60; m is an integer from 2 to 30; p is an integer from 0 to 5; and each q is an integer from 0 to 30.

Another embodiment provides that the above process of preparing a pigment dispersion further comprising an ultra-filtration step after step (e).

Another embodiment provides that the polymeric dispersant contains a cross-linkable moiety.

Another embodiment provides that the above process of preparing a pigment dispersion further comprising a step of reacting said polyetheramine and said cross-linkable moiety with a cross-linking agent.

Another embodiment provides that the cross-linking agent is one or more members selected from the group consisting of epoxide, isocyanate, carbodiimide, N-methylol, oxazoline, silane, and mixtures thereof.

Yet another embodiment provides an ink-jet ink comprising an aqueous ink-jet vehicle and an aqueous pigment dispersion, wherein said aqueous pigment dispersion is prepared by a process comprising the steps of:
(a) grinding a mixture comprising a pigment, a grinding agent and a vehicle to form a premix, wherein said grinding agent is insoluble in said vehicle and soluble in water,
(b) adding to said premix a polyetheramine having the formula (I):

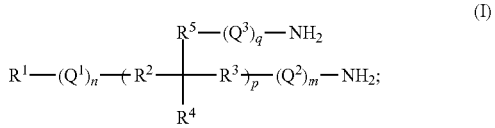

(c) grinding said premix and said polyetheramine together;
(d) washing with an aqueous medium to remove said grinding agent to form a press cake; and
(e) adding an aqueous vehicle and a polymeric dispersant, and dispersing said press cake from step (d), in this order or any other workable orders, to form a dispersion;
wherein each $Q^1$, $Q^2$ and $Q^3$ is independently —OCH₂CH₂— or —OCH₂CH(CH₃)—; R¹ is C₁-C₄ alkyl, —CH₂CH(NH₂)(CH₃) or NH₂; each R² is independently C₁-C₄ alkyl or a straight bond; each R⁴ is H, C₁-C₄ alkyl or -(Q³)_q-NH₂; each R⁵ is C₁-C₄ alkyl or a straight bond; n is an integer from 0 to 60; m is an integer from 2 to 30; p is an integer from 0 to 5; and each q is an integer from 0 to 30.

These and other features and advantages of the present embodiments will be more readily understood by those of ordinary skill in the art from a reading of the following Detailed Description. Certain features of the disclosed embodiments which are, for clarity, described above and below as a separate embodiment, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of" Similarly, the term "consisting essentially of" is intended to include examples encompassed by the term "consisting of."

As used herein, the term "dispersion" means a two phase system where one phase consists of finely divided particles (often in the colloidal size range) distributed throughout a bulk substance, of the particles being the dispersed or internal phase and the bulk substance being the continuous or external phase.

As used herein, the term "aqueous vehicle" refers to water or a mixture of water and at least one water-soluble, or partially water-soluble (i.e. methyl ethyl ketone), organic solvent (co-solvent).

As used herein, the term "Mw" means weight average molecular weight.

As used herein, the term "Mn" means number average molecular weight.

As used herein, the term "Pd" means polydispersity which is the weight average molecular weight divided by the number average molecular weight.

As used herein, the term "GPC" means gel permeation chromatography.

As used herein, the term "D50" means the volume particle diameter of the 50th percentile (median) of the distribution of particle sizes.

As used herein, the term 'D95' means the volume particle diameter of the 95th percentile of the distribution of particle sizes.

As used herein, the term "psi" means pounds of force per square inch of area, a pressure unit.

As used herein, the term "cPs" means centipoise, a viscosity unit.

As used herein, the term "mN·m−1" means milli Newtons per meter, a surface tension unit.

As used herein, the term "dyne/cm" means dyne per centimeter, a surface tension unit.

As used herein, the term "μS/cm" means micro-Siemens per centimeter, a conductivity unit.

As used herein, the term "mPa·s" means millipascal second, a viscosity unit.

As used herein, the term "AN" means acid number, mg KOH/gram of pigment.

As used herein, the term "Sulfolane" means tetramethylene sulfone.

As used herein, "IPDI" means isophorone diisocyanate.

As used herein, "APIZ" means aminopropyl imidazole.

As used herein, the term "EDTA" means ethylenediaminetetraacetic acid.

As used herein, the term "IDA" means iminodiacetic acid.

As used herein, the term "EDDHA" means ethylenediamine-di(o-hydroxyphenylacetic acid).

As used herein, the term "NTA" means nitrilotriacetic acid.

As used herein, the term "DHEG" means dihydroxyethylglycine.

As used herein, the term "CyDTA" means trans-1,2-cyclohexanediaminetetraacetic acid.

As used herein, the term "DTPA" means diethylenetriamine-N,N,N',N'',N''-pentaacetic acid.

As used herein, the term "GEDTA" means glycoletherdiamine-N,N,N',N'-tetraacetic acid.

As used herein, Proxel™ GXL is an antimicrobial agent supplied by Lonza Ltd., Basel, Switzerland.

Unless otherwise noted, the above chemicals were obtained from Aldrich (Milwaukee, Wis.) or other similar suppliers of laboratory chemicals.

In addition, references in the singular may also include the plural (for example, "a" and "an" may refer to one, or one or more) unless the context specifically states otherwise.

In one embodiment, the present disclosure provides a process for making a pigment press cake comprising the steps of:

(a) grinding a mixture comprising a pigment, a grinding agent and a vehicle to form a premix, wherein said grinding agent is insoluble in said vehicle and soluble in water, (b) adding to said premix a polyetheramine having the formula (I):

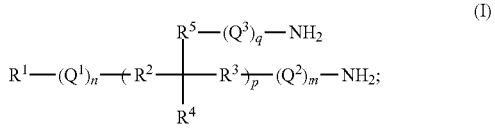

(c) grinding said premix and said polyetheramine together; and (d) washing with an aqueous medium to remove said grinding agent to form a press cake;

wherein each $Q^1$, $Q^2$ and $Q^3$ is independently —OCH$_2$CH$_2$— or —OCH$_2$CH(CH$_3$)—; $R^1$ is $C_1$-$C_4$ alkyl, —CH$_2$CH(NH$_2$)(CH$_3$) or NH$_2$; each $R^2$ and $R^3$ is independently $C_1$-$C_4$ alkyl or a straight bond; each $R^4$ is H, $C_1$-$C_4$ alkyl or -(Q$^3$)$_q$-NH$_2$; each $R^5$ is $C_1$-$C_4$ alkyl or a straight bond; n is an integer from 0 to 60; m is an integer from 2 to 30; p is an integer from 0 to 5; and each q is an integer from 0 to 30.

In step (a), a pigment, a grinding agent, and a vehicle are mechanically ground or kneaded together. The vehicle is typically an organic solvent soluble in water. Suitable organic solvents include, but are not limited to, $C_2$-$C_6$ diols such as ethylene glycol, propylene glycol, glycerin, triethylene glycol, diethylene glycol and dipropylene glycol; $C_1$-$C_8$ alcohols such as methanol, ethanol and propanol; amides such as formamide, dimethylformamide and N-methylpyrrolidone; and sulfoxides such as sulfolane and dimethyl sulfoxide. The grinding agent is insoluble in the vehicle and soluble in water. "Insoluble" means having a solubility of less than 0.005 gram of a solute, e.g., the grinding agent, in 1 liter of solvent, e.g., the vehicle, at 25° C. "Soluble" means having a solubility greater than or equal to 0.005 gram of a solute, e.g., the grinding agent, in 1 liter of solvent, e.g., water. Typical grinding agents are granular inorganic salts of proper sizes, such as micronized sodium chloride, potassium chloride, sodium sulphate, calcium chloride, aluminum chloride, zinc chloride and ferric chloride. Typically, the weight ratio of the grinding agent to pigment is from 3:1 to 20:1. More typically, the weight ratio of the grinding agent to pigment is from 6:1 to 10:1.

In step (b), a polyetheramine having the formula (I):

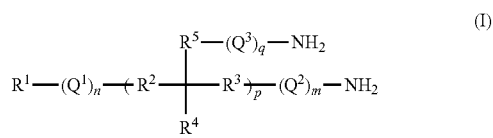

is added to the premix from step (a), where each $Q^1$, $Q^2$ and $Q^3$ is independently —OCH$_2$CH$_2$— or —OCH$_2$CH(CH$_3$)—; $R^1$ is $C_1$-$C_4$ alkyl, —CH$_2$CH(NH$_2$)(CH$_3$) or NH$_2$; each $R^2$ and $R^3$ is independently $C_1$-$C_4$ alkyl or a straight bond; each $R^4$ is H, $C_1$-$C_4$ alkyl or -(Q$^3$)$_q$-NH$_2$; each $R^5$ is $C_1$-$C_4$ alkyl or a straight bond; n is an integer from 0 to 60; m is an integer from 2 to 30; p is an integer from 0 to 5; and each q is an integer from 0 to 30. The weight ratio of the polyetheramine to the pigment is typically from 1:1000 to 1:5; more typically from 1:50 to 1:20.

In step (c), the premix and polyetheramine are subjected to grinding which is generally conducted in a stainless horizontal mixing vessel. Often grinding initially takes place at one temperature and continues to completion while the temperature is increased or decreased to facilitate mixing. Adequate grinding is usually achieved after grinding under the conditions described above for a period of from 30 minutes to 30 h. One of ordinary skill in the art can readily determine the amounts of the grinding agent and the vehicle to be used based on the particular paring of pigment and polyetheramine to form a mixture with suitable thickness for grinding.

During step (c), the grinding or kneading causes the polyetheramine to be adhered to the pigment surface. The polyetheramine is not chemically bonded to the pigment, but instead is physically entrapped onto the pigment surface. Thus the properties of the pigment surface are altered by the polyetheramine that is adhered to the pigment surface. The hydrophilic nature of the polyetheramine can facilitate the interaction between the pigment it adhered to and a dispersant to form a stable dispersion.

In step (d), the product of step (c) is washed with an aqueous medium to remove the grinding agent and the vehicle. The aqueous medium is typically water or a mixture of water with organic solvents such as methanol, ethanol or other $C_3$-$C_4$ alcohols. Adequate agitation is generally required to dissolve the grinding agent. Often it is necessary to adjust the pH to ionize the grinding agent to ease its removal. Typically, warm water is employed or heat is applied to facilitate this process. The mixture is separated by a filtration, followed by additional washing, to give a press cake of a treated pigment. The washing is usually monitored by measuring the conductivity of the filtrate. When the conductivity of the filtrate drops below 250 µS/cm, washing is deemed adequate.

In another embodiment, the present disclosure provides a process for making an aqueous pigment dispersion by incorporating a step (e) to the above process of making the pigment press cake.

In step (e), the press cake from step (d) is dispersed to form a pigment dispersion. This is done by adding an aqueous vehicle and a polymeric dispersant, and dispersing the press cake, in this order or any other workable orders. A high-speed disperser (HSD) is particularly suitable for this step. A high shear fluid processer, operated at from 500 rpm to 4000 rpm, and more typically from 2000 rpm to 3500 rpm, provides optimal shear to achieve the desired dispersing. Typically the dispersing is conducted under a pressure of up to 15,000 psi in a pass-to-pass mode for between 1 and 20 passes.

Optionally, the dispersion is further purified by an ultrafiltration step after step (e). The ultrafiltration can be carried out on any conventional cross-flow, hollow fiber membrane. Typically, the membrane has a fiber with inner diameter greater than 0.75 mm, more typically greater than 1 mm. Suitable commercially available materials for constructing the membrane include polyethylene, polypropylene, polysulfone, polyvinylidene fluoride, and ceramic.

Polyetheramine

The polyetheramines of the present disclosure can be readily prepared by one of ordinary skill in the art or are available from commercial sources. For example, Huntsman Corporation (Texas, U.S.A.) supplies many of the polyetheramines of Formula (I):

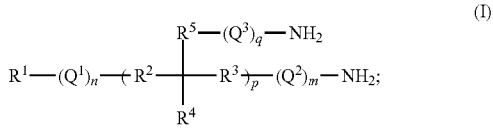

where $Q^1$, $Q^2$, $Q^3$, $R^1$, $R^2$, $R^3$, $R^4$, $R^5$, n, m, p and q are as defined above.

Colorants

A wide variety of organic and inorganic pigments, alone or in combination, may be dispersed with the dispersant polymer to prepare an ink, especially an ink-jet ink. The term "pigment" as used herein means an insoluble colorant that is required to be dispersed with a dispersant and processed under dispersive conditions in the presence of a dispersant. The colorant also includes dispersed dyes. The dispersion process results in a stable dispersed pigment. The pigment particles are sufficiently small to permit free flow of the ink through the ink-jet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Typically, the pigment particle size should range from about 0.005 to about 5 micron and, most typically, from about 0.005 to about 1 micron. The average particle size as measured by dynamic light scattering is less than about 500 nm, typically less than about 300 nm.

The selected pigment(s) may be used in dry or wet form. For example, pigments are usually manufactured in aqueous media, and the resulting pigments are obtained as a water-wet press cake. In press cake form, the pigment does not agglomerate to the extent as in dry form. Thus, pigments in water-wet press cake form do not require as much mixing energy to de-agglomerate in the premix process as pigments in dry form. Representative commercial dry pigments are listed in U.S. Pat. No. 5,085,698.

Some examples of pigments with coloristic properties useful in inkjet inks include: cyan pigments from Pigment Blue 15:3 and Pigment Blue 15:4; magenta pigments from Pigment Red 122 and Pigment Red 202; yellow pigments from Pigment Yellow 14, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255, Pigment Red 264 and Pigment Red 269; green pigments from Pigment Green 1, Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; white pigments such as $TiO_2$ and ZnO; and black pigment carbon black. The pigment names and abbreviations used herein are the "C.I." designation for pigments established by Society of Dyers and Colourists, Bradford, Yorkshire, UK and published in *The Color Index*, Third Edition, 1971.

In the case of organic pigments, the ink may contain up to approximately 30%, typically from 0.1% to about 25%, and more specifically from 0.25% to 10% of pigment, by weight based on the total ink weight. If an inorganic pigment is selected, the ink will tend to contain higher percentages by weight of pigment than with comparable inks employing organic pigment, since inorganic pigments generally have higher densities than organic pigments.

Dispersant

The polymeric dispersant may be a random or a structured polymer. Typically, the polymer dispersant is a copolymer of hydrophobic and hydrophilic monomers. The "random polymer" means polymers where molecules of each monomer are randomly arranged in the polymer backbone. For a reference on suitable random polymeric dispersants, see: U.S. Pat. No. 4,597,794. The "structured polymer" means polymers having a block, branched, graft or star structure. Examples of structured polymers include AB or BAB block copolymers such as the ones disclosed in U.S. Pat. No. 5,085,698; ABC block copolymers such as the ones disclosed in EP Patent Specification No. 0556649; and graft polymers such as the ones disclosed in U.S. Pat. No. 5,231,131. Other polymeric dispersants that can be used are described, for example, in U.S. Pat. No. 6,117,921, U.S. Pat. No. 6,262,152, U.S. Pat. No. 6,306,994 and U.S. Pat. No. 6,433,117.

Cross-Linking of Dispersant and Polyetheramine

The polymeric dispersant can contain cross-linkable functional moieties. The amino group on a polyetheramine is a cross-linkable functional moiety. The polymeric dispersant and the polyetheramine are thus capable of reacting with a cross-linking agent. Identified in the table below are suitable cross-linkable functional groups that are in the polymeric dispersant and the companion cross-linking groups that may be present in the cross-linking agent.

| Cross-linkable Moieties | Cross-linking Groups |
| --- | --- |
| COOH | Epoxide, Carbodiimide, Oxazoline, N-Methyol |
| Hydroxyl | Epoxide, Silane, Isocyanate, N-Methyol |
| Amino | Epoxide, Carbodiimide, Oxazoline, N-Methyol |

The mole ratio of the cross-linkable moieties on the polymeric dispersant and the polyetheramine to the cross-linking group(s) on the cross-linking agent is from 15:1 to 1:1.5, typically from 9:1 to 1:1.1, and most typically from 8:1 to 1:1. In calculating the mole ratio, all cross-linkable moieties on the polymeric dispersants and the polyetheramine, and all cross-linking groups on the cross-linking agent are included.

Ink Vehicle

The pigmented ink of this disclosure comprises an ink vehicle, typically an aqueous ink-jet vehicle, also known as an aqueous carrier medium or aqueous vehicle.

The ink vehicle is the liquid carrier (or medium) for the aqueous dispersion(s) and optional additives. The term "aqueous ink vehicle" refers to an ink vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink-jet ink, and the type of paper onto which the ink will be printed. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, Sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

A mixture of water and a polyhydric alcohol, such as diethylene glycol, is typical as the aqueous ink vehicle. In the case of a mixture of water and diethylene glycol, the ink vehicle usually contains from 30% water and 70% diethylene glycol to 95% water and 5% diethylene glycol, more typically from 60% water and 40% diethylene glycol to 95% water and 5% diethylene glycol. Percentages are based on the total weight of the ink vehicle. A mixture of water and butyl carbitol is also an effective ink vehicle.

The amount of ink vehicle in the ink is typically in the range of from 70% to 99.8%, and more typically from 80% to 99.8%, by weight based on total weight of the ink.

The ink vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. Typical 1,2-alkanediols are $C_4$-$C_6$ alkanediols with 1,2-hexanediol being most typical. Suitable surfactants include ethoxylated acetylene diols (e.g. Surfynol® series commercially available from Air Products), ethoxylated alkyl primary alcohols (e.g. Neodol® series commercially available from Shell) and secondary alcohols (e.g. Tergitol® series commercially available from Union Carbide), sulfosuccinates (e.g. Aerosol® series commercially available from Cytec), organosilicones (e.g. Silwet® series commercially available from Witco) and fluoro surfactants (e.g. Zonyl® series commercially available from DuPont).

The amount of glycol ether(s) and 1,2-alkanediol(s) added is typically in the range of from 1% to 15%, and more typically from 2% to 10% by weight, based on the total weight of the ink. Surfactants may be used, typically in the amount of from 0.01% to 5% and more typically from 0.2% to 2%, by weight based on the total weight of the ink.

Other Additives

Other ingredients, additives, may be formulated into the inkjet ink, to the extent that such other ingredients do not interfere with the stability and jettability of the inkjet ink. This may be readily determined by routine experimentation by one skilled in the art.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Polymers may be added to the ink to improve durability or other properties. The polymers can be soluble in the vehicle or in a dispersed form, and can be ionic or nonionic. Soluble polymers include linear homopolymers and copolymers or block polymers. They also can be structured polymers including graft or branched polymers, stars and dendrimers. The dispersed polymers may include, for example, latexes and hydrosols. The polymers may be made by any known process including, but not limited to, free radical, group transfer, ionic, condensation and other types of polymerization. They may be made by a solution, emulsion, or suspension polymerization process. Typical classes of polymer additives include anionic acrylic, styrene-acrylic and polyurethane polymer.

When a polymer is present, its level is typically between about 0.01% and about 3% by weight, based on the total weight of an ink. The upper limit is dictated by ink viscosity or other physical limitations.

Biocides may be used to inhibit growth of microorganisms.

Fillers, plasticizers, pigments, carbon black, silica sols, other polymer dispersions and the known leveling agents, wetting agents, antifoaming agents, stabilizers, and other additives known for the desired end use, may also be incorporated into the dispersions.

Ink Properties

Jet velocity, separation length of the droplets, drop size and stream stability are greatly affected by the surface tension and the viscosity of the ink. Pigmented ink-jet inks typically have a surface tension in the range of about 20 mN·m$^{-1}$ to about 70 mN·m$^{-1}$, at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not to clog to a significant extent in an ink jet apparatus. Further, the ink should not corrode g of the ink jet printing device it comes in contact with, and it should be essentially odorless and non-toxic.

Although not restricted to any particular viscosity range or printhead, the inks of the disclosure are particularly suited to lower viscosity applications. Thus the viscosity (at 25° C.) of the inks of this disclosure may be less than about 7 mPa·s, or less than about 5 mPa·s, and even more advantageously, less than about 3.5 mPa·s.

The following examples illustrate certain embodiments without, however, being limited thereto.

EXAMPLES

Particle Size Measurements

The particle size for the dispersions, pigments and the inks were determined by dynamic light scattering using a Microtrac® UPA 150 analyzer from Honeywell/Microtrac (Montgomeryville, Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to derive the particle size distribution. Results are reported as D50 or D95.

Determination of Acid Number

In the present disclosure, Acid Number is expressed as milligram (mg) KOH per gram of pigment (mg KOH required to titrate 1 gram of pigment). To determine the Acid Number of a pigment, 50 grams of a mixture of 80% of water and 20% of ethanol are added to 5 grams of dry pigment, followed by sufficient amount of an aqueous KOH (11.7 N) to bring the pH to at least 11.0. The resulting slurry is titrated under agitation with aqueous HCl (0.5 M) while the pH is monitored and recorded. The pH trace thus obtained has two inflection points with the first inflection point (typically near pH 8) representing the amount of acid required to neutralize the excess KOH in the solution, and the second inflection point (typically near pH 5) representing the amount of acid required to neutralize both the excess KOH and the KOH that was consumed to neutralize the acid groups on the pigment. The number of mmol of HCl added between these two inflection points is equivalent to the number of mmol of acid on the pigment. Multiplying this number of mmol by the molecular weight of KOH and dividing by the original weight (gram) of the pigment in the titrated sample provides the Acid Number for the pigment in a unit of mg KOH per gram of pigment.

Polymer 1: IPDI/T650/APIZ

To a 2 L reactor were charged 165.9 g of polyTHF650 (supplied by BASF), 449.7 g of Sulfolane (5% Proglyde™ DMM, supplied by Dow Chemical Company), 0.39 g of dibutyl tin dilaurate and 96.2 g of dimethylol propionic acid. The reaction mixture was heated to 72° C. To the mixture was added 238.4 g of IPDI over a period of 25 min followed by 30 g of Sulfolane. The reaction was held at 80° C. for 2.5 h. The measured % NCO content was 0.88%. To the reaction mixture was added 24.4 g of APIZ over 10 min. The reaction was held at 80° C. for 1 h, and the measured % NCO content was 0.3%. After another 1 h at 80° C., the polyurethane solution was inverted under high speed mixing by adding a mixture of aqueous KOH (45%, 80.4 g) and 281.5 g of water followed by an additional 635.6 g of water and 2.0 g of Proxel™ GXL. The resulting polyurethane dispersion had a viscosity of 130.2 cPs, solid contents of 27.43%, a pH of 8.81, a number average molecular weight (Mn) by GPC of 5094 and a PD of 2.21.

Modification of Pigment Surface

Pigments 1-8 were subjected to treatment with various polyetheramines as described below.

Pigment 1

To a 1-gallon stainless horizontal mixer equipped with sigma blade kneading arms (Baker Perkins, Model AN4-2) were charged 125 g of Pigment Red 269 (PR 269, as TRC269-02 supplied by Trust Chemical), 912.5 g of micronized sodium chloride (supplied by Cargill), 187.5 g of diethylene glycol and 25 g of Jeffamine® D-230 (supplied by Huntsman). The temperature of the heating jacket was set to 150° C., and the mixture was kneaded for 6 hours. The temperature of the heating jacket was reduced to 60° C., and the mixture was kneaded for an additional 17 h and 35 min.

In two separate 4 liter glass beakers, 550 g of the kneaded mixture was mixed into 2 liters of warm water and stirred with vigorous agitation. The pH of the diluted mixture was adjusted to less than 1.0, and the mixture was heated to 98° C. and held at that temperature for 2 h.

The pigment slurry from both beakers was filtered and washed with deionized water to remove salt and solvent until the conductivity of the filtrate reached 120 µS/cm to give a pigment press cake containing 29.1% of solids.

Pigment 2

To a 1-gallon stainless horizontal mixer equipped with sigma blade kneading arms (Baker Perkins, Model AN4-2) were charged 125 g of PR 269 (as TRC 269-02 supplied by Trust Chemical), 912.5 g of micronized sodium chloride (supplied by Cargill), 187.5 g of diethylene glycol and 25 g of Jeffamine® D-400 (supplied by Huntsman). The temperature of the heating jacket was set to 150° C., and the mixture was kneaded for 6 h. The temperature of the heating jacket was reduced to 60° C., and the mixture was kneaded for an additional 18 h.

In two separate 4 liter glass beakers, 550 g of the kneaded mixture was mixed into 2 liters of warm water and stirred with vigorous agitation. The pH of the diluted mixture was adjusted to less than 1.0, and the mixture was heated to 98° C. and held at that temperature for 2 h.

The pigment slurry from both beakers was filtered and washed with deionized water to remove salt and solvent until the conductivity of the filtrate reached 450 µS/cm to give a pigment press cake containing 31.8% of solids.

Pigment 3

To a 1-gallon stainless horizontal mixer equipped with sigma blade kneading arms (Baker Perkins, Model AN4-2) were charged 125 g of Pigment Red 184 (PR 184, as TRC 184-01 supplied by Trust Chemical), 912.5 g of micronized sodium chloride (supplied by Cargill), 187.5 g of diethylene glycol and 25 g of Jeffamine® D-400 (supplied by Huntsman). The temperature of the heating jacket was set to 125° C., and the mixture was kneaded for 6 h. The temperature of the heating jacket was reduced to 60° C., and the mixture was kneaded for an additional 18 h.

In two separate 4 liter glass beakers, 550 g of the kneaded mixture was mixed into 2 liters of warm water and stirred with vigorous agitation. The pH of the diluted mixture was adjusted to less than 1.0, and the mixture was heated to 98° C. and held at that temperature for 2 h.

The pigment slurry from both beakers was filtered and washed with deionized water to remove salt and solvent until the conductivity of the filtrate reached 460 µS/cm. The filter cake was left to dry overnight to give a pigment press cake containing 51.7% of solids.

Pigment 4

To a 1-gallon stainless horizontal mixer equipped with sigma blade kneading arms (Baker Perkins, Model AN4-2) were charged 125 g of Pigment Red 146 (PR 146, as Naphthol Carmine 4635C supplied by Cappelle Pigments), 962.5 g of micronized sodium chloride (supplied by Cargill), 150.0 g of diethylene glycol and 25 g of Jeffamine® D-230 (supplied by Huntsman). The temperature of the heating jacket was set to 125° C., and the mixture was kneaded for 6 h. The temperature of the heating jacket was reduced to 60° C., and the mixture was kneaded for an additional 20 h.

In two separate 4 liter glass beakers, 550 g of the kneaded mixture was mixed into 2 liters of warm water and stirred with vigorous agitation. The pH of the diluted mixture was adjusted to less than 1.0, and the mixture was heated to 98° C. and held at that temperature for 2 h.

The pigment slurry from both beakers was filtered and washed with deionized water to remove salt and solvent until the conductivity of the filtrate reached 430 µS/cm. The filter cake was left to dry in a hood with airflow overnight to give a pigment press cake containing 92.2% of solids.

Pigment 5

To a 1-gallon stainless horizontal mixer equipped with sigma blade kneading arms (Baker Perkins, Model AN4-2) were charged 125 g of PR 146 (as Naphthol Carmine 4635C supplied by Cappelle Pigments), 962.5 g of micronized sodium chloride (supplied by Cargill), 150.0 g of diethylene glycol and 25 g of Jeffamine® D-400 (supplied by Huntsman). The temperature of the heating jacket was set to 125° C., and the mixture was kneaded for 6 h. The temperature of the heating jacket was reduced to 60° C., and the mixture was kneaded for an additional 18 h.

In two separate 4 liter glass beakers, 550 g of the kneaded mixture was mixed into 2 liters of warm water and stirred with vigorous agitation. The pH of the diluted mixture was adjusted to less than 1.0, and the mixture was heated to 98° C. and held at that temperature for 2 h.

The pigment slurry from both beakers was filtered and washed with deionized water to remove salt and solvent until the conductivity of the filtrate reached 80 µS/cm. The filter cake was left to dry in a hood with airflow overnight to give a pigment press cake containing 98.4% solids.

Pigment 6

To a 1-gallon stainless horizontal mixer equipped with sigma blade kneading arms (Baker Perkins, Model AN4-2) were charged 125 g of PR 269 (as TRC 269-02 supplied by Trust Chemical), 987.5 g of micronized sodium chloride (supplied by Cargill), 150.0 g of diethylene glycol and 25 g of Surfonamine L-100 (supplied by Huntsman). The temperature of the heating jacket was set to 125° C., and the mixture was kneaded for 6 h. The temperature of the heating jacket was reduced to 60° C., and the mixture was kneaded for an additional 18 h.

In two separate 4 liter glass beakers, 550 g of the kneaded mixture was mixed into 2 liters of warm water and stirred with vigorous agitation. The pH of the diluted mixture was adjusted to less than 1.0, and the mixture was heated to 98° C. and held at that temperature for 2 h.

The pigment slurry from both beakers was filtered and washed with deionized water to remove salt and solvent until the conductivity of the filtrate reached 450 µS/cm. The filter cake was left to dry overnight to give a pigment press cake containing 55.0% solids.

Pigment 7

To a 1-gallon stainless horizontal mixer equipped with sigma blade kneading arms (Baker Perkins, Model AN4-2) were charged 125 g of PR 269 (as TRC 269-02 supplied by Trust Chemical), 987.5 g of micronized sodium chloride (supplied by Cargill), 150.0 g of diethylene glycol and 25 g of Surfonamine® L-300 (supplied by Huntsman). The temperature of the heating jacket was set to 125° C., and the mixture was kneaded for 6 h. The temperature of the heating jacket was reduced to 60° C., and the mixture was kneaded for an additional 20 h.

In two separate 4 liter glass beakers, 550 g of the kneaded mixture was mixed into 2 liters of warm water and stirred with vigorous agitation. The pH of the diluted mixture was adjusted to less than 1.0, and the mixture was heated to 98° C. and held at that temperature for 2 h.

The pigment slurry from both beakers was filtered and washed with deionized water to remove salt and solvent until the conductivity of the filtrate reached 10 µS/cm. The filter cake was left to dry overnight to give a pigment press cake containing 53.9% of solids.

Pigment 8

Pigment 8 was prepared using Pigment Red 122 (PR 122, supplied by Sun Chemical) and Jeffamine® T403 (supplied by Huntsman) using a procedure similar to the ones for the preparation of Pigments 1-7.

Preparation of Pigment Dispersions

The following procedure was used to prepare the magenta dispersions. Pigments 1-8 prepared above were dispersed with Polymer 1 utilizing a Buhler PML Mill. The process began with a premix of typically 20-30% of pigment loading and targeted a final dispersant level of having a pigment/dispersant (P/D) ratio of 2.5. A P/D of 2.5 corresponds to a 40% dispersant level on pigment. Optionally, a co-solvent was added at 10% of the total dispersion formulation to facilitate pigment wetting and dissolution of dispersant in the premix stage and ease of grinding during milling stage. Although other similar co-solvents are suitable, triethylene glycol monobutyl ether (TEB as supplied from Dow Chemical) was the co-solvent of choice. Dispersant was pre-neutralized with KOH to facilitate solubility and dissolution into water. During the premix stage, the pigment level was maintained at typically 23-25%. The premix was subsequently processed with a Silverson (Model No.) rotor/stator device typically for 1-2 hours before solids were subsequently reduced to about 16-22% during the milling stage by the addition of de-ionized water for optimal media mill grinding conditions. After completion of the milling stage, which was typically 2-3 hours, the pigment levels in the dispersions were reduced to about 10 to 15% by dilution with de-ionized water.

Similarly, two control dispersions using PR 269 and PR 184 as pigment, and Polymer 1 as dispersant were prepared. The pigments were not treated with any polyetheramine.

Testing of Print Reliability

The dispersions were formulated into inks using a standard ink-jet ink vehicle targeting for a pigment concentration of 4.2%. Each ink was filled into an HP940 cartridge and printed using an HP 8000 printer (Hewlett-Packard Co.). The reliability test consisted of repeatedly printing a test image for 80 pages without performing any printhead maintenance. After every ten pages, a nozzle check pattern is printed and the number of nozzles in the print head not firing (missing) is counted. The print head has approximately 1,056 nozzles. The number of missing nozzles is used as a measure of print reliability. The fewer nozzles that are missing from the nozzle check pattern, the better the print reliability.

TABLE 1

| Example | Pigment | Polyetheramine | Number of nozzles out after 80 pages of printing | Fraction of nozzles firing after 80 pages |
|---|---|---|---|---|
| 1 | PR 269 | Jeffamine ® D-230 | 7 | 99.3% |
| 2 | PR 269 | Jeffamine ® D-400 | 13 | 98.8% |
| 3 | PR 184 | Jeffamine ® D-400 | 57 | 94.6% |
| 4 | PR 146 | Jeffamine ® D-230 | 31 | 97.1% |
| 5 | PR 146 | Jeffamine ® D-400 | 85 | 92.0% |
| 6 | PR 269 | Surfonamine ® L100 | 0 | 100.0% |
| 7 | PR 269 | Surfonamine ® L300 | 2 | 99.8% |
| 8 | PR 122 | Jeffamine ® T-403 | 0 | 100.0% |
| Control Ex. 1 | PR 269 | None | 1056 | 0% |
| Control Ex. 2 | PR 184 | None | 1056 | 0% |

As shown in Table 1, Examples 1-8, containing inks made with pigments treated with polyetheramines, had a small number of nozzles out after 80 pages of printing. The control examples, made with pigments without any treatment with polyetheramines, had a large number of nozzle out after 80 pages of printing.

What is claimed is:

1. A process for making a pigment press cake comprising the steps of:
   (a) grinding a mixture comprising a pigment, a grinding agent and a vehicle to form a premix, wherein said grinding agent is insoluble in said vehicle and soluble in water,
   (b) adding to said premix a polyetheramine having the formula (I):

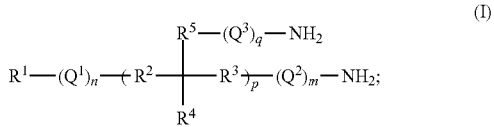

(c) grinding said premix and said polyetheramine together; and
   (d) washing with an aqueous medium to remove said grinding agent to form a press cake;
wherein each $Q^1$ and $Q^3$ is independently —OCH$_2$CH$_2$— or —OCH$_2$CH(CH$_3$)—; each $Q^2$ is —OCH$_2$CH(CH$_3$)—; $R^1$ is CH$_2$CH(NH$_2$)(CH$_3$) or NH$_2$; each $R^2$ and $R^3$ is independently $C_1$-$C_4$ alkyl or a straight bond; each $R^4$ is H, $C_1$-$C_4$ alkyl or -(Q$^3$)$_q$-NH$_2$; each $R^5$ is $C_1$-$C_4$ alkyl or a straight bond; n is an integer from 0 to 60; m is an integer from 2 to 30; p is 0; each q is an integer from 0 to 30; and said grinding agent is an inorganic salt.

2. The process of claim 1, wherein $Q^1$ is —OCH$_2$CH$_2$—.
3. The process of claim 1, wherein n is 0.
4. The process of claim 3, wherein m is from 2 to 10.
5. The process of claim 1, wherein $R^1$ is —CH$_2$CH(NH$_2$)(CH$_3$).
6. The process of claim 5, wherein $Q^1$ is —OCH$_2$CH$_2$—.
7. A process for making an aqueous pigment dispersion comprising the steps of:
   (a) grinding a mixture comprising a pigment, a grinding agent and a vehicle to form a premix, wherein said grinding agent is insoluble in said vehicle and soluble in water,
   (b) adding to said premix a polyetheramine having the formula (I):

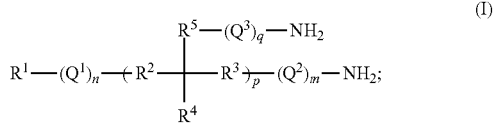

(c) grinding said premix and said polyetheramine together;
   (d) washing with an aqueous medium to remove said grinding agent to form a press cake; and
   (e) adding an aqueous vehicle and a polymeric dispersant, and dispersing said press cake from step (d), in this order or any other workable orders, to form a dispersion;
wherein each $Q^1$, $Q^2$ and $Q^3$ is independently —OCH$_2$CH$_2$— or —OCH$_2$CH(CH$_3$)—; $R^1$ is $C_1$-$C_4$ alkyl, —CH$_2$CH(NH$_2$)(CH$_3$) or NH$_2$; each $R^2$ and $R^3$ is independently $C_1$-$C_4$ alkyl or a straight bond; each $R^4$ is H, $C_1$-$C_4$ alkyl or -(Q$^3$)$_q$-NH$_2$; each $R^5$ is $C_1$-$C_4$ alkyl or a straight bond; n is an integer from 0 to 60; m is an integer from 2 to 30; p is an integer from 0 to 5; each q is an integer from 0 to 30; and said polymeric dispersant contains a cross-linkable moiety.

8. The process of claim 7, further comprising an ultrafiltration step after step (e).
9. The process of claim 7, further comprising a step of reacting said polyetheramine and said cross-linkable moiety with a cross-linking agent.
10. The process of claim 9, wherein said cross-linking agent is one or more members selected from the group consisting of epoxide, isocyanate, carbodiimide, N-methylol, oxazoline, silane, and mixtures thereof.
11. An ink-jet ink comprising an aqueous ink-jet vehicle and an aqueous pigment dispersion, wherein said aqueous pigment dispersion is prepared by a process comprising the steps of:
   (a) grinding a mixture comprising a pigment, a grinding agent and a vehicle to form a premix, wherein said grinding agent is insoluble in said vehicle and soluble in water,
   (b) adding to said premix a polyetheramine having the formula (I):

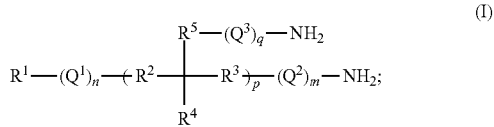

(c) grinding said premix and said polyetheramine together;
   (d) washing with an aqueous medium to remove said grinding agent to form a press cake; and
   (e) adding an aqueous vehicle and a polymeric dispersant, and dispersing said press cake from step (d), in this order or any other workable orders, to form a dispersion;

wherein each $Q^1$, $Q^2$ and $Q^3$ is independently —OCH$_2$CH$_2$— or —OCH$_2$CH(CH$_3$)—; $R^1$ is $C_1$-$C_4$ alkyl, —CH$_2$CH(NH$_2$)(CH$_3$) or NH$_2$; each $R^2$ and $R^3$ is independently $C_1$-$C_4$ alkyl or a straight bond; each $R^4$ is H, $C_1$-$C_4$ alkyl or -(Q$^3$)$_q$-NH$_2$; each $R^5$ is $C_1$-$C_4$ alkyl or a straight bond; n is an integer from 0 to 60; m is an integer from 2 to 30; p is an integer from 0 to 5; each q is an integer from 0 to 30; and said polymeric dispersant contains a cross-linkable moiety.

\* \* \* \* \*